US010298125B2

(12) United States Patent
Stoeger et al.

(10) Patent No.: US 10,298,125 B2
(45) Date of Patent: May 21, 2019

(54) DC-DC CONVERTER WITH ACTIVE RETURN FLOW LOCKOUT AND METHOD FOR OPERATING A DC-DC CONVERTER

(71) Applicant: Continental Automotive GmbH, Hannover (DE)

(72) Inventors: Christian Stoeger, Vienna (AT); Emil Kovatchev, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/786,096

(22) Filed: Oct. 17, 2017

(65) Prior Publication Data

US 2018/0109190 A1 Apr. 19, 2018

(30) Foreign Application Priority Data

Oct. 17, 2016 (DE) .................. 10 2016 220 201

(51) Int. Cl.
*H02M 3/00* (2006.01)
*H02M 3/156* (2006.01)
(Continued)

(52) U.S. Cl.
CPC .......... *H02M 3/1563* (2013.01); *H02J 1/102* (2013.01); *H02M 3/1584* (2013.01);
(Continued)

(58) Field of Classification Search
None
See application file for complete search history.

(56) References Cited

U.S. PATENT DOCUMENTS

| 5,920,475 | A | 7/1999 | Boylan et al. |
| 2010/0156366 | A1* | 6/2010 | Sakai .................. H02M 3/1588 323/282 |
| 2010/0301826 | A1 | 12/2010 | Moussaoui et al. |

FOREIGN PATENT DOCUMENTS

EP 2819288 A1 12/2014

OTHER PUBLICATIONS

Hassan Pooya Forghani-zadeh et al, Student Member, IEEE, Georgia Tech Analog Consortium et al, "Current-Sensing Techniques for DC-DC Converters".

(Continued)

*Primary Examiner* — Jue Zhang
*Assistant Examiner* — Henry E Lee, III

(57) ABSTRACT

The disclosure relates to a DC-DC converter in which a first coil terminal is connected with an input terminal and a second coil terminal is connected, on the one hand, via a rectification switch to an output terminal and, on the other hand, via a control switch to a ground potential and a control circuit is configured to switch in successive switching cycles in each case in a regulating phase the rectification switch to be electrically blocking and the control switch to be electrically conducting, and in a rectifying phase to switch the control switch to be electrically blocking. A measuring component generates a measurement signal which signals a current intensity of a coil current, and a comparator circuit compares the measurement signal with a threshold value and the control circuit keeps the rectification switch electrically blocking in the rectifying phase and conducts the coil current via a bypass diode if the current intensity was continuously lower than the threshold value in the regulating phase.

6 Claims, 2 Drawing Sheets

(51) Int. Cl.
  *H02J 1/10*    (2006.01)
  *H02M 3/158*   (2006.01)
  *H02M 3/335*   (2006.01)
  *H02M 1/00*    (2006.01)

(52) U.S. Cl.
  CPC ..... *H02M 3/1588* (2013.01); *H02M 3/33584* (2013.01); *H02M 3/33592* (2013.01); *H02M 2001/0009* (2013.01); *Y02B 70/1466* (2013.01)

(56) References Cited

OTHER PUBLICATIONS

Datasheet Intersil Americas LLC, dated Feb. 12, 2016, ISL78229, "2-Phase Boost Controller with Drivers and I2C/PMBus".
MAXIM, 19-5187, Rev 0; Jun. 2010, "High-Voltage HB LED Drivers with Integrated High-Side Current Sense".
Texas Instruments Incorporated, Anthony Fagnani, Analog Applications Journal, 2Q2013, "Synchronous rectification boosts efficiency by reducing power loss".
DE Office Action issued by the German Patent and Trademark Office dated May 15, 2017.

* cited by examiner

DC-DC CONVERTER WITH ACTIVE RETURN FLOW LOCKOUT AND METHOD FOR OPERATING A DC-DC CONVERTER

DETAILED DESCRIPTION

Figure 1:
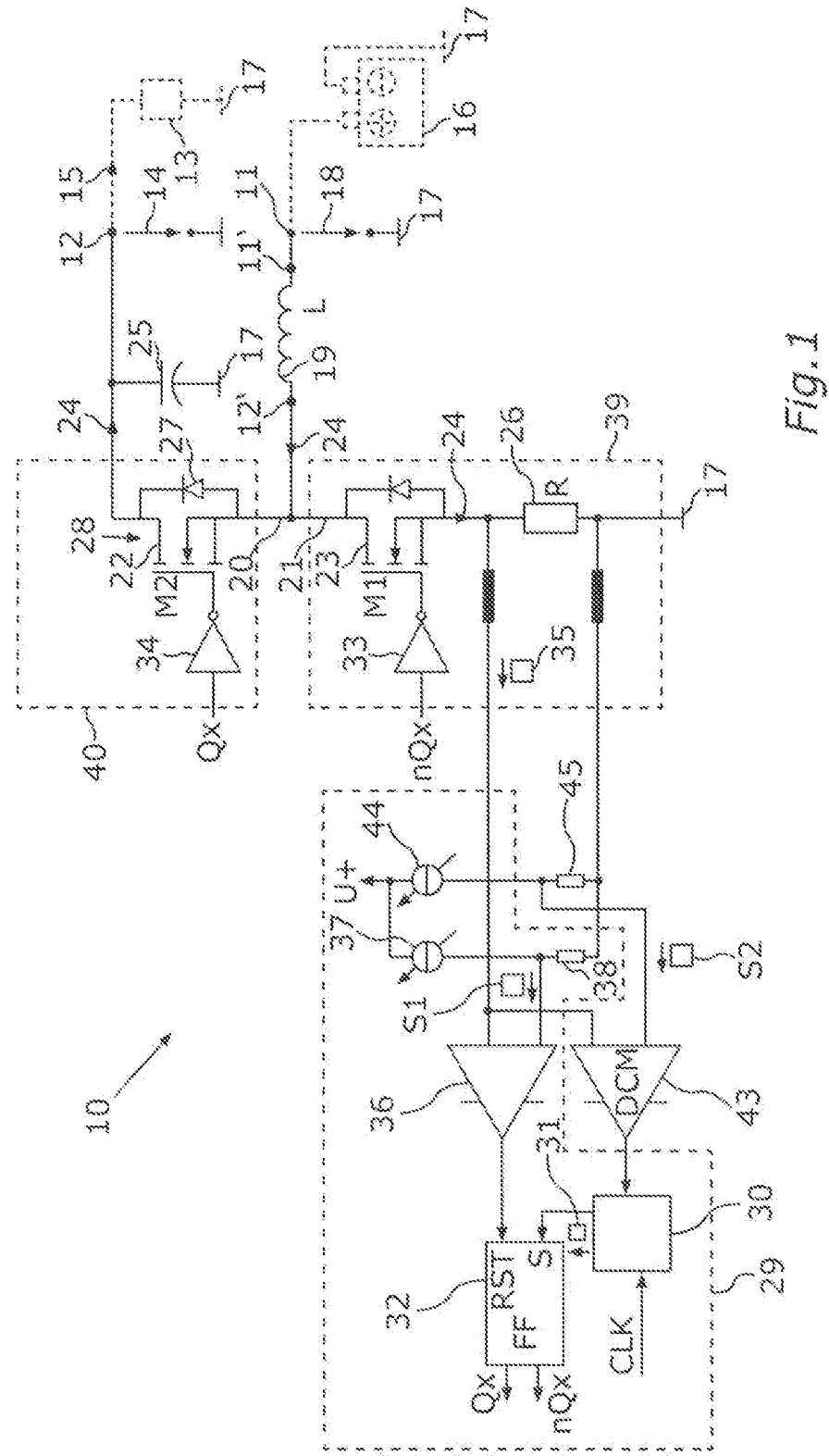
FIG. 1 is a diagrammatic representation of an exemplary embodiment of the DC-DC converter.

The disclosure relates to a DC-DC converter which is configured as synchronous converter. In other words, the DC-DC converter has a switchable transistor or generally a rectification switch as return flow lockout instead of a diode. The disclosure also includes a method for operating such a DC-DC converter.

In addition to the actual regulating switch which is herein called a control switch, synchronous converters have a rectifying switch also called a rectification switch. The rectification switch replaces the diode with which the return flow of the current must otherwise be blocked passively in the case of a DC-DC converter. The said switches are often formed by a transistor.

For converting a voltage level, a synchronous DC-DC converter then uses an electrical coil, a first coil terminal of which is connected to the input terminal of the DC-DC converter and a second coil terminal is connected to two independent circuit branches. One circuit branch leads via the rectification switch to the output terminal and the other circuit branch leads via the control switch to the ground potential. A control circuit is connected to these two switches (rectification switch and control switch) to control them and configured to switch in each case in successive switching cycles in a control phase the rectification switch to be electrically blocking and the control switch to be electrically conducting and in a subsequent rectifying phase to switch the control switch to be electrically blocking. In the control phase, the coil current of the coil thus flows starting from the input terminal via the control switch to the ground potential and thus charges up the coil with magnetic energy. In the subsequent rectifying phase, the control switch is switched to be electrically blocking so that the electrical coil now drives its coil current toward the output terminal. The rectification switch is thus switched to be electrically conducting and locking again at correct times.

If up-conversion is performed with the DC-DC converter (input voltage lower than output voltage), it may happen that, with a low load at the output terminal, the direction of flow of the current reverses in the rectifying phase and a current flows from the output terminal via the rectification switch through the coil to the input terminal. For this reason, the rectification switch should be switched to be electrically blocking at the correct time when the direction of flow reverses.

Thus, the rectification switch preferably switches in accordance with an ideal diode in that the output current flows through it in the forward direction to the output terminal of the DC-DC converter.

In order to detect a reversal of direction of the current flow (DCM—Discontinuous Current Mode) a detection circuit may implemented, for example one described in EP 2 819 288 A1 which, however, is very expensive.

The disclosure contemplates implementing a synchronous DC-DC converter in a technically simple manner, with a return lockout, and a corresponding method for operating a DC-DC converter.

An aspect of the disclosure relates to a DC-DC converter in which a first coil terminal of an electrical coil is connected with an input terminal of the DC-DC converter and a second coil terminal is connected, on the one hand, via a rectification switch to an output terminal of the DC-DC converter and, on the other hand, via a control switch to a ground potential and a control circuit connected to the rectification switch. The control switch is configured to switch in successive switching cycles in each case in a regulating phase the rectification switch to be electrically blocking and the control switch to be electrically conducting and in a following rectifying phase to switch the control switch to be electrically blocking. Furthermore, a measuring component is provided, the measuring component being configured to generate in the regulating phase (i.e. when the current flows from the input terminal via the coil and the control switch to the ground potential) a measuring signal which signals a current intensity of the electrical coil current flowing through the coil. A comparator circuit is configured to compare the measurement signal with a predetermined threshold value. It is thus detected if the coil current has a greater current intensity than the threshold value during the regulating phase. The measurement signal then does not need to describe the coil current directly, it may also be proportional to the coil current, that is to say, for example, an electrical voltage. The threshold value is then correspondingly adapted.

The said control circuit for the control switch and the rectification switch is configured to switch the rectification switch to be electrically conducting if the comparator circuit signals that the current intensity was greater than the threshold value in the regulating phase, in the subsequent rectifying phase, that is to say when the control switch is switched to be electrically blocking and it is important to decide whether a return flow could arise.

Furthermore, the control circuit is also configured to keep the rectification switch to be blocking if the measurement signal signals that the current intensity was continuously lower than the threshold value in the regulating phase. The coil current is thus not conducted through the switching path of the rectification switch, that is to say, for example in the case of a transistor, the drain-source link. Instead, the coil current is conducted via a diode to the output terminal. The diode which is called bypass diode because it bypasses the switching path of the rectification switch, provides the advantage that the coil current remains rectified by the bypass diode, i.e. does not reverse its direction of flow. In the case of the DC-DC converter with the rectification switch and the control switch according to the said aspect, a prevention of a return flow of the coil current is thus enabled in a manner which is technically simple to implement.

With a sufficiently large coil current in the regulating phase (greater than the threshold value) it may be assumed that in the subsequent rectifying phase, the coil current will flow permanently or continuously in the direction toward the output terminal, that is to say there will not be a reversal of direction of the current flow. It is only with a low current flow, e.g. a current intensity less than the threshold value that the current flow threatens to reverse its direction which is why, a bypass diode is used instead of the rectification switch switched to be electrically conductive, for this case. Thus, the control circuit assumes in the regulating phase with a coil current greater than the threshold value that in the subsequent rectifying phase, a reversal of direction of the current flow will not occur and utilizes only with a lower current intensity than the threshold value, when a reversal of direction of the current flow threatens, for this case the bypass diode instead of the rectification switch switched to be electrically conductive. One advantage may then be obtained that by means of a simple comparator and a logic for switching the rectification switch a control of the synchronous converter or DC-DC converter is implemented for avoiding a return flow. This is technically a small expenditure and thus cost-effective and operationally reliable.

During the change from the regulating phase into the rectifying phase, it may occur, independently of an electrical load actually connected to the output terminal, that a voltage peak or current peak is caused, that is to say a sporadic rise in the coil current is caused. So that this is not wrongly interpreted as a sufficiently large coil current and, therefore, the rectification switch is switched to be electrically conductive, it is preferable that the control circuit is configured to evaluate the comparator circuit with a predetermined time offset after the blocking of the control switch. Thus, it initially waits until a voltage level of the measurement signal has settled. This may be achieved, for example, by means of a microcontroller by a wait command.

By drawing a conclusion during the regulating phase from the current intensity of the coil current whether there will be a zero current or a reversal of current direction during the subsequent rectifying phase, no actual zero current detection (ZCD) is necessary. In other words, the DC-DC converter may be produced particularly cost-effectively in that a current intensity of the coil current is unmonitored in the rectifying phase. In other words, the measuring component described is installed or connected into that circuit branch which only leads to the ground potential and not to the output terminal.

The said rectification switch is preferably provided by a transistor which has a body diode. This may then be utilized advantageously as the bypass diode or form the latter. The control switch may also be formed on the basis of a transistor. In particular, it is provided that each transistor is designed as MOSFET (Metal Oxide Field Effect Transistor).

As already stated, the current path is branched starting from the second coil terminal, namely once in a direction toward the output terminal (via the rectification switch) and, on the other hand, to the ground potential (via the control switch). In this context, the measuring component for generating the measurement signal is preferably an electrical resistor which precedes or follows the control switch in such a manner that the measuring component is in the circuit branch leading to the ground potential, that is to say the coil current flows through the measuring component exclusively in the regulating phase. The measuring component is thus arranged in the regulating current path. This avoids power dissipation being implemented in the measuring component while the DC-DC converter is in the rectifying phase.

Operating the DC-DC converter according to the disclosure is one of methods contemplated by the disclosure. A further aspect thus relates to a method for operating a DC-DC converter as synchronous up converter, wherein a control circuit in successive switching cycles, respectively in a regulating phase switches the rectification switch to be electrically blocking and the control switch to be electrically conducting. In the subsequent rectifying phase, the control switch is switched to be electrically blocking. In order to then decide whether the rectification switch is to be switched to be electrically conducting in order to thus guide the coil current via the switching path of the rectification switch to the output terminal, a comparator circuit generates in the regulating phase a measurement signal which signals the current intensity of the electrical coil current flowing through the electrical coil. The comparator circuit compares the measurement signal with a predetermined threshold value and the control circuit decides based thereon in the rectifying phase whether the rectification switch is switched to be electrically conducting. The rectification switch is switched to be electrically conducting if the comparator circuit signals that the current intensity was greater than the threshold value in the regulating phase. The rectification switch is kept or switched to be electrically blocking and, as a result, the coil current is conducted in the manner described by the bypass diode to the output terminal if the comparator circuit signals that the current intensity was continuously lower than the threshold value in the regulating phase so that the control circuit, in the regulating phase, with a coil current greater than the threshold value assumes that in the subsequent rectifying phase, a reversal of direction of the current flow will not occur and only with a lower current intensity than the threshold value, when the current flow threatens to reverse its direction, uses the bypass diode for this case instead of the rectification switch switched to be electrically conductive.

The disclosure includes developments of the method which have features as have already been described as related to the features of the DC-DC converter. For this reason, the corresponding features of the method are not restated here.

In the figures, functionally similar or identical elements may in each case be provided with the same reference symbols.

FIG. 1 shows an exemplary DC-DC converter 10 which, for example, may be provided in a motor vehicle. The DC-DC converter 10 may have an input terminal 11 and an output terminal 12. By means of the DC-DC converter 10, an electrical load or an electrical load 13 may be operated with an output voltage 14 and an operating current 15. The electrical energy needed for this purpose may be received via the input terminal 12 from a voltage source 16. For this purpose, a coil terminal 11' may be connected electrically to the input terminal 11. The input voltage 18 may be lower than the output voltage 14 (up- or boost conversion). The respective circuits at the input terminal 11 and output terminal 12 may be closed via a ground potential 17.

In order to generate the output voltage 14 from the input voltage 18, the DC-DC converter may have an electrical coil 19 having an inductance L and two current paths or circuit branches 20, 21. The circuit branch 20 may have a control switch 22 via which a coil terminal 12' of the electrical coil 19 is connected to the output terminal 12. In the circuit branch 20, a smoothing capacitor 25 may also be provided.

The current path 21 may have a control switch 23 via which the coil terminal 12' is connected to the ground potential 17 independently of the circuit branch 20.

The rectification switch 22 may be a MOSFET M2, the control switch 23 may be a MOSFET M1. A coil current 24 may flow or be conducted alternately between the circuit branches 20, 21 by alternating switching of the rectification switch 22 and the control switch 23. The rectification switch 22 may additionally have a body diode which, as bypass diode 27, may conduct a switching path 28 between drain and source of the rectification switch 22 the coil current 24 with rectification switch 22 switched to be blocking toward output terminal 12 and blocks a return flow from output terminal 12 toward coil 19. Thus, a current flow to the output terminal 12 is also possible when the rectification switch 22 is switched to be blocking.

In the circuit branch 21, a measuring component 26 may be connected before regulating switch 23 or (as shown in FIG. 1) after regulating switch 23 in order to determine a current intensity of the coil current 24. The measuring component 26 may be an electrical resistor or shunt resistor having an ohmic resistance value R.

For switching the switch 22, 23, a control circuit 29 may be provided which may control the rectification switch 22 by means of a switching signal Qx and the control switch 23 by means of an inverse switching signal nQx. A switching logic 30 may here decouple the signal Qx and the inverse signal nQx and generate for this purpose a decoupling signal 31 by means of which a flip-flop 32 (FF) used for generating the signals Qx, nQx may switch in such a manner that when the flip-flop 32 is reset (RST=1, S=0), the switching signal nQx is set to be equal to 1 and, by this means, the control switch 23 is switched to be electrically blocking (in an electrically blocking state) due to an inverter 33 without the rectification switch 22 being switched to be electrically conductive by means of Qx in this process if the decoupling signal 11 is set so that, due to an inverter 34, the rectification switch 22 is kept to be electrically blocking with signaled decoupling signal 31. When the decoupling signal 31 is not set, in contrast, the synchronous operation according to the known function of the flip-flop 32 and the subsequent inverters 33, 34 is performed.

For switching the flip-flop 32, a measurement signal 35 may be generated by means of the measuring component 26, which signal, by means of a comparator 36 detects in a manner known per se for a hysteretic regulation (two-point regulation) a lower threshold value S1 of the current intensity of the coil current 24 with control switch 23 switched to be electrically conducting and rectification switch 22 to be electrically blocking (lower regulating limit). The threshold value S1 may be set in the manner represented by means of a current source 37 and an electric resistor 38 in dependence on an operating voltage U+. During this regulating phase 39, the coil current 24 thus flows through the circuit branch 21 for as long as until it is signaled by the measurement signal 54 that the current intensity of the coil current 24 is less than the threshold value S1. Comparator 36 then sets the flip-flop 32 to RST=1.

By the blocking of the current switch 23 triggered by this means, the coil current 24 is diverted into the circuit branch 20 which results in a rectifying phase 40. During this process, it may be decided by the circuit logic 30 whether the rectification switch 22 is switched to be electrically conductive or kept electrically blocking. In the latter case, the coil current 24 is conducted through the bypass diode 27.

Figure 2:
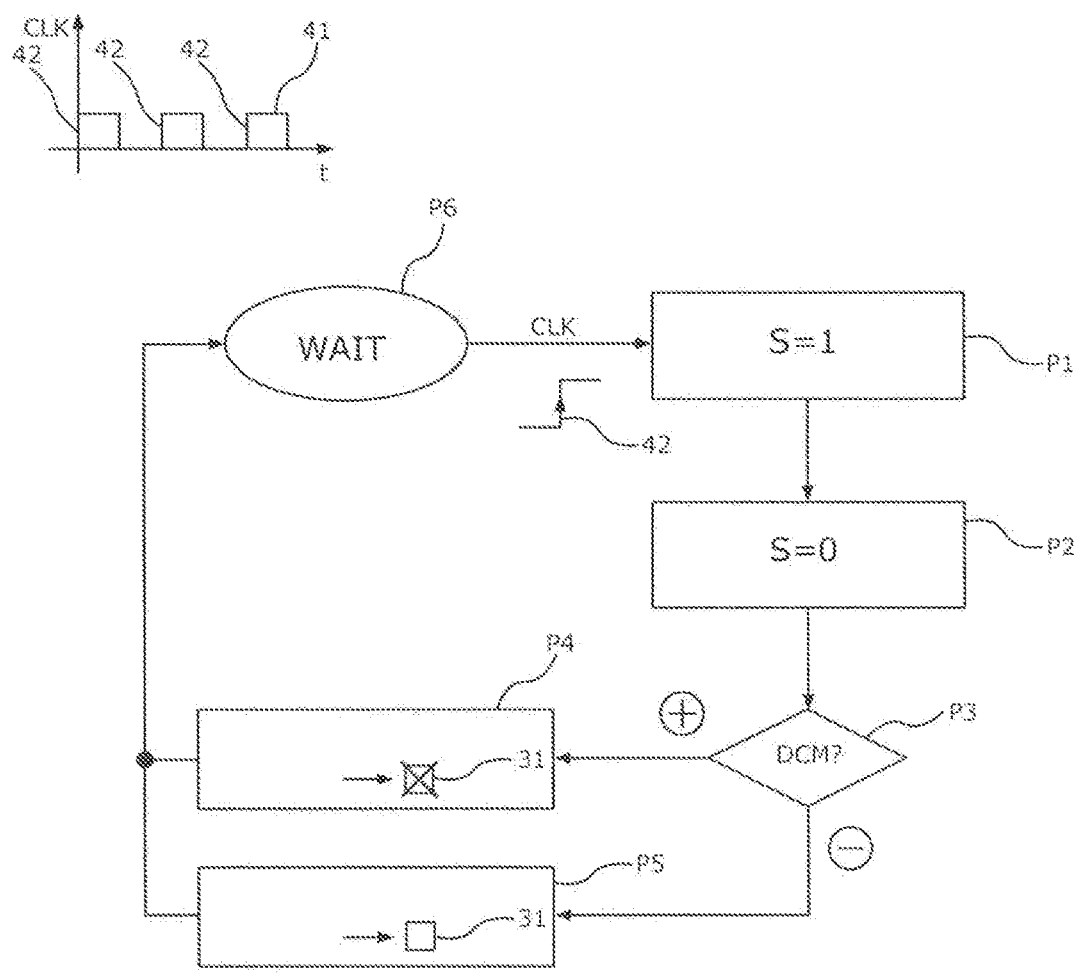
FIG. 2 is a graphic flowchart illustrating an exemplary embodiment of the method which may be performed at the DC-DC converter according to FIG. 1.

FIG. 2 illustrates this decision of the circuit logic 30. The circuit logic 30 may have, for example, a microcontroller.

The DC-DC converter 10 may be operated as fixed-frequency voltage converter and may have for this purpose a clock signal 41 (CLK) with rising edges 42 following one another over time (switch-on edges). With rising edge 42, the flip-flop 32 may be set in a process step P1 (S=1) and this may be held for a waiting time T and, after that, the setting may be canceled in a process step P2 (S=0) and a further waiting time T may be waited. After that, it may be checked in a process step P3 whether during the regulating phase 39, the measurement signal 35 has exceeded a predetermined second threshold value S2 which may be detected and signaled by a comparator 43. The comparator 43 checks by this manner whether there is a possibility or hazard or risk of a return flow of the coil current 24 toward the input terminal 11 during the impending rectifying phase 40 (DCM). The threshold value S2 may be set by means of a voltage source 44 and a resistor 45 in the manner described.

If the comparator 43 signals the transgression of the threshold value S2 (symbolized by a plus sign "+"), the synchronous operation of the rectification switch 22 may be set with the control switch 23 in a process step P4, i.e. the decoupling signal 31 may be suppressed so that the rectification switch 22 is switched to be electrically conducting with the blocking of the control switch 23.

If the comparator 43 has signaled that the threshold value S2 has not been exceeded in the regulating phase 39 (symbolized by a minus sign "−"), the decoupling signal 31 may be set or generated in a process step P5 and by this means the rectification switch 22 may be kept to be electrically blocking in the rectifying phase 40 although the control switch 23 is also switched to be electrically blocking.

In both cases, it is possible to wait for the rectifying phase in a next process step P6, i.e. to wait for the next rising edge 42 (WAIT).

Thus, electrical losses are converted by the coil current 24 at the measuring component 26, i.e., for example, a shunt resistor R, only in the regulating circuit, i.e. circuit branch 21, and correspondingly reduced over the duty cycle of the converter 10.

As a result, however, no information is available about the coil current 24 during the rectifying phase 40. However, this is of interest only if the coil current 24 was low in the regulating phase 39 in such a way that there is a risk that the coil current 24 becomes 0 in the rectifying phase 40 or is even inverted. The DC-DC converter 10 therefore detects by means of the comparator 43, when the control switch 23 is switched on or switched to be electrically conducting whether a starting value of the coil current 24 in the regulating phase 39 is high enough to switch the rectifying MOSFET M2, or generally the rectification switch 22, to be conducting at all in the rectifying phase 40. If the coil current 24 is not sufficiently high (defined by the threshold value S2), the coil current 24 will flow via the body diode as bypass diode 27 of the rectifying MOSFET M2 in the rectifying phase 40. Although this creates more losses, this is only in the case in which little energy is transmitted. In addition, the measuring component 26 may be applied to the ground potential 17 which renders the current measurement to be particularly simple to implement.

Some of the advantages may thus be that for high or large coil currents 24, the arrangement of the measuring component 26 is in the regulating circuit branch 21 and for boost converters additionally at the ground potential 17 and, for low coil currents 24, the DC-DC converter 10 operates or functions like a conventional, non-synchronous converter (using the bypass diode 27). The decision is made in each switching cycle (sequence of regulating phase 39 and rectifying phase 40) individually as a result of which unnecessary losses are prevented.

The DC-DC converter 10 also saves the expenditure of a ZCD (Zero Current Detection) which would mean either an additional circuit or additional losses in the circuit branch 20.

In the method illustrated in FIG. 2, the current measurement is interrupted by S=1. So that the switch-on voltage peak is not immediately switched off again, there is a wait for the period of time T between the process steps P1 and P2. Appropriately, there is also another wait for the period of time T (between process steps P2 and P3) before the decision is made whether the rectifying MOSFET M2 becomes active in the rectifying phase 40.

Overall, the example shows how a DCM detection may be provided for fixed-frequency voltage converters.

The foregoing description is for purposes of illustration only. The true scope of the invention is set forth in the following claims.

The invention claimed is:

1. A DC-DC converter comprising:
 a first coil terminal of an electrical coil connected with an input terminal of the DC-DC converter and a second coil terminal of the coil connected, first, via a rectification switch to an output terminal of the DC-DC converter and, second, via a control switch to a ground potential,
 a control circuit connected to the rectification switch and the control switch, the control circuit configured to switch in successive switching cycles, respectively, in a regulating phase the rectification switch to be electrically blocking and the control switch to be electrically conducting, and in a rectifying phase to switch the control switch to be electrically blocking,
 a measuring component configured to generate in the regulating phase a measurement signal which signals a current intensity of an electric coil current flowing through the coil,
 a comparator circuit configured to compare the measurement signal with a predetermined threshold value,
 wherein the control circuit is configured to switch, in the rectifying phase, the rectification switch to be electrically conducting, if the comparator circuit signals that the current intensity in the regulating phase was greater than the threshold value, and is further configured to keep the rectification switch to be electrically blocking and to cause the coil current to be conducted via a bypass diode to the output terminal if the current intensity in the regulating phase was continuously lower than the threshold value, and wherein the control circuit, in the regulating phase, with a coil current greater than the threshold value determines that in the subsequent rectifying phase there will not be a reversal of direction of the current flow, and with a current intensity less than the threshold value, when the current flow reverses its direction, causes the current to be conducted via the bypass diode instead of the rectification switch.

2. The DC-DC converter as claimed in claim 1, wherein the control circuit is configured to evaluate the comparator circuit with a predetermined time offset after the blocking of the control switch.

3. The DC-DC converter as claimed in claim 1, wherein a current intensity of the coil current is unmonitored in the rectifying phase.

4. The DC-DC converter as claimed in claim 1, wherein the rectification switch comprises a transistor comprising a body diode comprised in the bypass diode.

5. The DC-DC converter as claimed in claim 1, wherein the measuring component comprises an electric resistor generating the measurement signal, the electric resistor preceding or following the control switch in such a manner that the coil current flows through the measuring component exclusively in the regulating phase.

6. A method for operating a DC-DC converter as synchronous up converter, at a control circuit, in successive switching cycles, respectively in a regulating phase switching a rectification switch to be electrically blocking and a control switch to be electrically conducting, and in a rectifying phase switching the control switch to be electrically blocking,
 at a comparator circuit, in the regulating phase, generating a measurement signal signaling a current intensity of an electric coil current flowing through an electric coil,
 at a comparator circuit comparing the measurement signal with a predetermined threshold,
 at the control circuit, in the rectifying phase, switching the rectification switch to be electrically conducting if the comparator circuit signals that the current intensity in the regulating phase was greater than the threshold value, and switching the rectification switch to be electrically blocking and, the coil current being conducted via a bypass diode to an output terminal if the comparator circuit signals that the current intensity in the regulating phase was continuously lower than the threshold value, and
 at the control circuit, in the regulating phase, with a coil current greater than the threshold value, determining that in the subsequent rectifying phase a reversal of direction of the current flow will not occur and only with a lower current intensity than the threshold value, when the current flow reverses its direction, causing the current to be conducted via the bypass diode instead of the rectification switch.

* * * * *